Patented Nov. 6, 1951

2,574,040

UNITED STATES PATENT OFFICE 2,574,040

CONDENSATION PRODUCTS OF UREIDES AND FORMALDEHYDE

Harry Jones, Rochdale, and John Kempton Aiken, Sale, England, assignors to The Geigy Company Limited, Manchester, England, a British company No Drawing. Application February 20, 1948, Serial No. 9,967. In Great Britain February 24, 1947

9 Claims. (Cl. 260—70)

This invention concerns improvements in and relating to condensation products of trichlorethylidenediureide and formaldehyde.

It is known that trichlorethylidenediureide (chloraldiurea) is almost insoluble in the majority of common organic solvents, and that it is relatively inert chemically, being only slowly attacked by concentrated sulphuric acid or by an aqueous solution of caustic soda.

It has now been found that trichlorethylidenediureide will react readily with formaldehyde giving water-soluble or water-insoluble products according to the conditions of reaction. The source of the formaldehyde may either be formaldehyde as such or a substance which liberates formaldehyde under the conditions of the reaction such as hexamine.

One object of the present invention is to provide synthetic condensation products of trichlorethylidenediureide and formaldehyde. Another object is to provide stable, concentrated aqueous dispersions of such synthetic condensation products. Another object is to provide synthetic condensation products which on stoving or prolonged ageing show only a slight tendency to craze. These and other objects of the invention will be apparent from the following description.

We have found synthetic condensates which are of industrial value can be made by heating trichlorethylidenediureide with a member of the group consisting of formaldehyde and substances yielding formaldehyde.

The mechanism of the reaction between the diureide and the formaldehyde appears to be similar to that underlying the formation of urea-formaldehyde resins. An intermediate product may first be formed which is substantially insoluble in cold water but soluble in hot water, and which on heating evolves formaldehyde and becomes increasingly insoluble in hot water. By restricting the quantity of formaldehyde, however, it is possible to arrive directly at a product which is substantially insoluble in hot or cold water. The hot-water-soluble product is probably a polymethylol derivative.

When trichlorethylidenediureide is heated with an aqueous solution of formaldehyde the rate of formation of the hot-water-soluble product is controlled by the pH of the aqueous medium. To obtain the hot-water-soluble product the condensation is advantageously carried out at a pH of between either 2 and 7, preferably between 4 and 7, or between 8.5 and 12. If the solution is strongly alkaline the reaction stops altogether and if it is too strongly acid then a water-insoluble, infusible resin is formed with great rapidity making it difficult to stop at the hot-water-soluble stage.

40% commercial formaldehyde contains a little acid, as impurity, and if such solution is used as a source of the formaldehyde the quantity of acid thereby introduced is sufficient to catalyse the reaction.

When carrying out the alkali-catalysed reaction it is preferable to add a small proportion of a weak volatile alkali, such as ammonia, to the reaction medium rather than a strong non-volatile alkali, such as sodium hydroxide. Strong non-volatile alkalies retard the resin-forming reaction, tend to decompose the trichlorethylidenediureide and remain in the resin after drying.

When the initial condensation is carried out in an acid medium which has a pH of not less than 2 the resin so formed, although soluble in hot water, is not soluble in cold water and consequently is precipitated when the reaction mixture cools. This precipitation is advantageous if the intermediate condensation product is to be separated but is undesirable when a stable, concentrated dispersion of the resin in a cold aqueous medium is required, for example, for treatment of textiles.

This undesirable situation does not arise when the process is carried out under faintly alkaline conditions. The resin syrup so formed remains clear and stable on storage at room temperature for long periods, and once prepared its stability is unaffected by the addition of strong acids. In this latter respect it differs notably from aqueous dispersions of urea-formaldehyde resins. The resin may be precipitated from its dispersion by the addition of a large amount of cold water since it has only a limited range of miscibility with the latter. The solid resin so obtained has generally similar properties to those obtained by preparation in an acid medium which has a pH of not less than 2.

A stable, concentrated dispersion of the resin in a cold aqueous medium may be prepared even in an acid medium which has a pH of not less than 2 if a polyhydroxy compound is also present.

The polyhydroxy compound may be, for example ethylene glycol, diethylene glycol, glycerol, pentaerythritol, or a half acetal thereof, or an ester containing more than one free hydroxy group per molecule such as those of tartaric acid or those obtained by condensation of excess of a polyhydric alcohol with a polybasic acid e. g. bis (hydroxyethyl) sebacate, or a polyglyceryl phthalate prepared by cautious condensation of equimolar amounts of glycerol and phthalic anhydrides. The polyhydroxy compound may be present initially or it may be added only after the trichlorethylidenediureide and the formaldehyde have been preliminarily heated. There is a disadvantage in having it present at the start; it may form a volatile product with the formaldehyde and consequently this loss should be obviated by having present a larger amount of the polyhydroxy compound and formaldehyde.

The resin syrup formed in such an acid medium in the presence of a polyhydroxy compound has properties generally similar to that obtained by condensation in a faintly alkaline medium. It possesses this advantage, however, that on stoving or prolonged ageing its tendency to craze, which is somewhat characteristic of trichlorethylidenediureide-formaldehyde resin films, is only comparatively slight.

The properties of the hot-water-soluble condensation product may be altered by heating it with a monohydric alcohol, preferably a primary alcohol. The duration of treatment with the alcohol is important in that if it is only brief then the product obtained even if insoluble in hot water is still insoluble in aromatic hydrocarbons and incompatible with most synthetic resins. If the duration of treatment is more prolonged then the product obtained is not only insoluble in hot water but soluble in aromatic hydrocarbons and compatible with nitro-cellulose, polyvinyl chloride, urea-formaldehyde and phenolic resins and with most plasticisers.

The alcohol may either be added to the reaction mixture at the start of the reaction or after the reaction has reached the hot-water-soluble stage whereafter the heating is continued in the presence of the alcohol or it may be added to the isolated condensation product and the mixture heated.

The condensation products of the present invention can be used in moulding powders and are useful for coating and adhesive purposes, and their solutions give clear, hard, glossy films on air-drying or stoving. Stoving insolubilises the condensation product and the rate at which this occurs decreases with increasing time of heating with alcohol.

The stable, concentrated aqueous dispersions of the resins are very suitable for the treatment of textiles.

These condensation products have the advantage over urea-formaldehyde resins that they can be made more soluble in aromatic hydrocarbons.

The substances usually incorporated in synthetic resins such as fillers, colouring matter, plasticisers etc. may also be incorporated with the products of the present invention.

In the following examples which are illustrative and not limiting in any way, all parts are parts by weight.

*Example 1*

3 parts of trichlorethylidenediureide are heated with 10 parts of 40% aqueous formaldehyde with thorough stirring until a clear solution is obtained. The liquid is cooled and an equal volume of cold water added. A soft resin is precipitated which hardens on keeping. This resin is soluble in hot water and in alcohols; on heating it evolves formaldehyde and becomes insoluble.

*Example 2*

To 100 parts of commercial 40% aqueous formaldehyde, concentrated ammonia (e. g. 0.88) is added until the solution is faintly alkaline to litmus. 30 parts of trichlorethylidenediureide are then added and the mixture heated with stirring at about 80° C. until a clear solution is obtained (about 1½ hours) and thereafter for a further hour with slow evaporation (in vacuo if desired) at such a rate that the product has about half its original bulk. On cooling, the syrup so formed remains clear and shows no perceptible alteration on storage in a closed vessel for several months; nor is it affected by addition of up to 5% of organic or mineral acids. On stoving at 100° C. it becomes hard, infusible, and insoluble. On addition of water to the clear syrup, a pasty resin is precipitated which hardens on keeping and, after grinding and drying at ordinary temperatures, is soluble in alcohols and ketones.

*Example 3*

3 parts of the resin produced and isolated according to Example 1 are heated with 10 parts of n-butanol so that slow distillation takes place, until the solution remains clear on cooling to room temperature (about 30 minutes). On removal of the unreacted n-butanol in vacuo a clear light-coloured resin is obtained which is soluble in alcohols, insoluble in aromatic hydrocarbons, compatible with urea-formaldehyde resins, but incompatible with most other synthetic resins. On heating it rapidly becomes insoluble.

In the above example the resin is combined with n-butanol to an extent sufficient to give insolubility in hot water but insufficient to give solubility in aromatic hydrocarbons

*Example 4*

3 parts of the resin produced and isolated according to Example 1 are boiled with 10 parts of n-butanol so that slow distillation takes place for three hours, the n-butanol being made good as required. On removal of the unreacted n-butanol in vacuo a clear amber-coloured resin is obtained which is soluble in alcohols, ketones, aromatic hydrocarbons, and compatible with polyvinyl chloride, nitrocellulose, urea-formaldehyde and phenolic resins and with most plasticisers. Its solutions give clear hard films on stoving or air-drying.

In the above example the resin is combined with n-butanol to an extent sufficient to give insolubility in hot water and solubility in aromatic hydrocarbons.

*Example 5*

7 parts of trichlorethylidenediureide are heated with 10 parts of 40% aqueous formaldehyde and 10 parts n-butanol until a clear solution is obtained, and thereafter with slow distillation for three hours, the n-butanol being made good as required. On removal of the unreacted n-butanol a resin similar to that of Example 4 is obtained.

*Example 6*

As for Example 3 with amyl alcohol being substituted for n-butanol. A darker coloured resin, more soluble in organic solvents and giving more water resistant films is obtained.

*Example 7*

30 parts of trichlorethylidenediureide, and 100 parts of 40% commercial aqueous formaldehyde are heated together at 80° C. with stirring until a clear solution is obtained (about 1 hour).

10 parts of ethylene glycol are then added and heating continued with slow evaporation (in vacuo if desired) at such a rate that after 2 hours about half the original bulk remains. A resin syrup generally similar to that of Example 2 is obtained, whose films are resistant to immersion in cold water and show little sign of crazing on prolonged ageing or stoving at 100° C.

*Example 8*

As in Example 7, except that 15 parts of pentaerythritol monochloral,

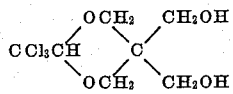

prepared according to our co-pending application Serial No. 19,643, filed April 7, 1948, now Patent No. 2,525,681, issued October 10, 1950, are substituted for 10 parts of ethylene glycol. A product similar to that Example 7 is obtained.

Following the general procedure shown in Examples 7 and 8 ethylene glycol and pentaerythritol monochloral may be replaced by, for example, diethylene glycol, glycerol, penta erythritol or any half acetal thereof, or an ester containing more than one free hydroxy group per molecule.

Whether the process is effected in a faintly alkaline medium, or in an acid medium having a pH of not less than 2 and containing a polyhydroxy compound, the temperature at which it is carried out is preferably between 60° C. and 100° C. and especially at 80° C. At higher temperatures there is a greater risk of discoloration and at lower temperatures the reaction is very slow.

We declare that what we claim is:

1. A process for the preparation of a synthetic condensation product which comprises heating trichlorethylidenediureide with an excess of formaldehyde in an aqueous medium.

2. A process for the preparation of a synthetic condensation product which comprises heating trichlorethylidenediureide with an excess of formaldehyde in an aqueous medium having a pH between 2 and 7.

3. A process for the preparation of a synthetic condensation product which comprises heating trichlorethylidenediureide with an excess of formaldehyde in an aqueous medium having a pH between 2 and 7, and in which a compound selected from the group consisting of polyhydric alcohols, esters having a plurality of free alcoholic hydroxyl groups and acetals having a plurality of free alcoholic hydroxyl groups, free from reactive substituents other than the alcoholic hydroxyl group, is also present.

4. A process for the preparation of a synthetic condensation product as claimed in claim 3 in which the compound selected from the group consisting of polyhydric alcohols, esters having a plurality of free alcoholic hydroxyl groups and acetals having a plurality of free alcoholic hydroxyl groups, free from reactive substituents other than the alcoholic hydroxyl group, is only added after the formaldehyde and the trichlorethylidenediureide have been preliminarily heated.

5. A process for the preparation of a synthetic condensation product which comprises heating trichlorethylidenediureide with an excess of formaldehyde in an aqueous medium having a pH between 2 and 7 and in which a monohydric alcohol free from reactive substituents other than the alcoholic hydroxyl group, is also present.

6. A process for the preparation of a synthetic condensation product as claimed in claim 5 in which the monohydric alcohol is added only after the reaction has reached the hot-water-soluble stage.

7. A process for the preparation of a synthetic condensation product as claimed in claim 5, in which the monohydric alcohol is added after the hot-water-soluble condensation product has been isolated.

8. A process for the preparation of a synthetic condensation product which comprises heating 3 parts of trichlorethylidenediureide with about 10 parts of 40% commercial formaldehyde until a clear solution is obtained.

9. A process for the preparation of a synthetic condensation product which comprises heating 7 parts of trichlorethylidenediureide with about 10 parts of 40% commercial formaldehyde until a clear solution is obtained.

HARRY JONES.
JOHN KEMPTON AIKEN.

REFERENCES CITED

The following references are of record in the file of this patent:

UNITED STATES PATENTS

| Number | Name | Date |
|---|---|---|
| 2,277,480 | D'Alelio | Mar. 24, 1942 |